May 4, 1965  T. R. SMITH  3,181,790
FLUID FLOW CONTROL DEVICE
Original Filed Feb. 2, 1959  2 Sheets-Sheet 1
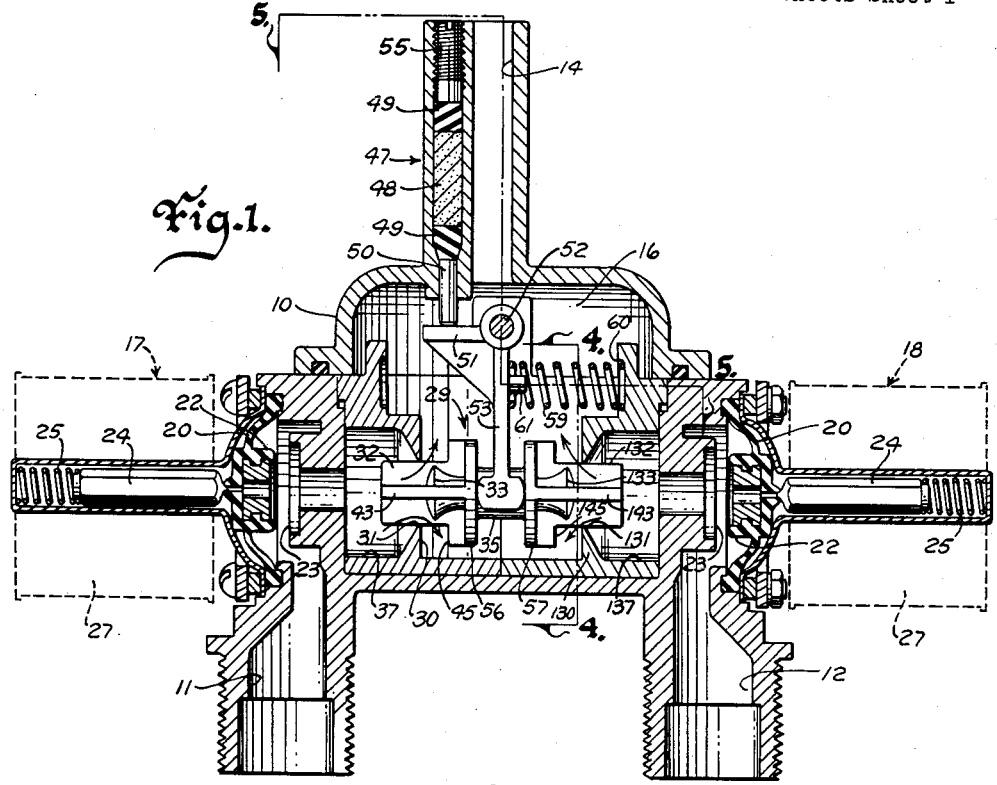
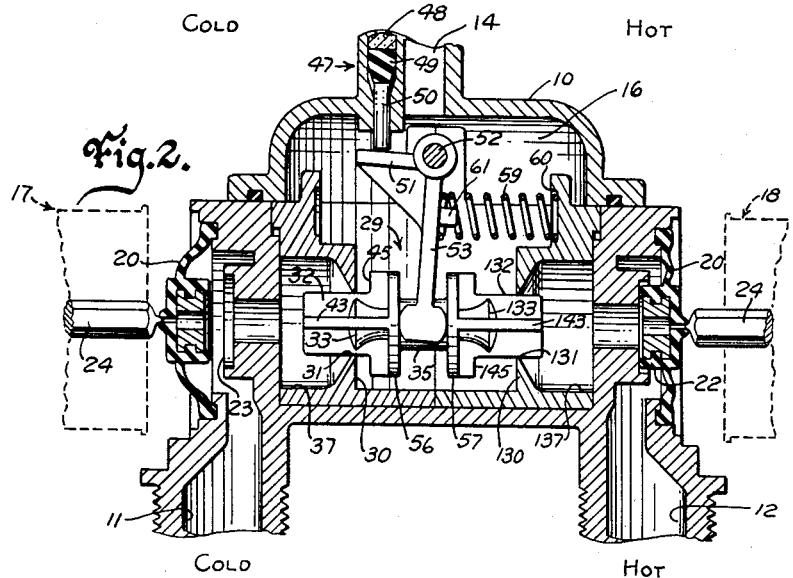
Inventor
Thomas R. Smith
by William G. Landwier
Agent May 4, 1965

T. R. SMITH 3,181,790

FLUID FLOW CONTROL DEVICE

Original Filed Feb. 2, 1959

COLD

HOT

Inventor
Thomas R. Smith
by William E. Landwier
Agent ated May 4, 1965

3,181,790
FLUID FLOW CONTROL DEVICE
Thomas R. Smith, Newton, Iowa, assignor to The Maytag Company, Newton, Iowa, a corporation of Delaware
Continuation of abandoned application Ser. No. 790,725, Feb. 2, 1959. This application July 12, 1963, Ser. No. 294,591
7 Claims. (Cl. 236—12)

The present invention relates to fluid flow control devices and more particularly to such devices for automatically supplying water having the desired temperature characteristics to washing machines and the like.

This is a continuation of U.S. Serial No. 790,725, filed February 2, 1959, now abandoned.

In automatic washing machines, it is frequently desired that water be supplied to the unit for the various washing and rinsing operations performed therein having temperatures selectable by the operator to obtain the optimum washing results for the particular fabric and condition of soil of said fabric being washed. It is frequently desired that during the complete washing cycle, hot water, cold water, and warm water within a predetermined temperature range be selectively available during various phases of the cycle of the automatic washer.

It is among the objects of this invention to provide a simple mixing valve capable of supplying hot, cold, or fluids within a predetermined intermediate temperature range. It is a further object of this invention to provide a thermostatically controlled fluid mixing valve having hot and cold fluid inlet connections each controlled by a solenoid valve. A further object is to provide an improved simply constructed mixing valve having a thermostatically actuated proportioning, or throttling member, operative to control the rate of flow of fluids only within a predetermined temperature range. A further object is to provide a thermostatically regulated mixing valve capable of delivering a fluid of a selected temperature extreme, such as either the hot or cold fluid, controlled by a solenoid actuated valve in each respective fluid inlet, without adversely affecting the thermostatically actuated proportioning valve construction.

Further objects and advantages of this invention will become evident as the description proceeds and from an examination of the accompanying drawings which illustrates one embodiment of the invention and in which similar numerals refer to similar parts throughout the several views.

In the drawings:

FIGURE 1 is a cross-sectional view of the invention showing the valve inlet ports open;

FIGURE 2 is a partial cross-section of the invention showing an intermediate position of the thermostatically controlled valve mechanism immediately after energization of only one inlet valve;

Figure 3:
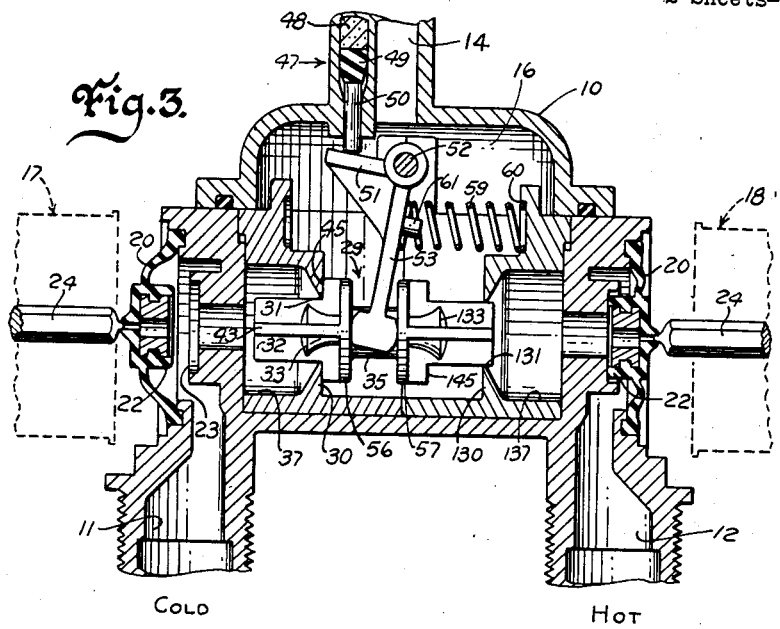
FIGURE 3 is a partial section of the invention wherein the thermostatically controlled valve is shown in its seated position subsequent to the solenoid actuated opening of a single inlet valve.
Figure 4:
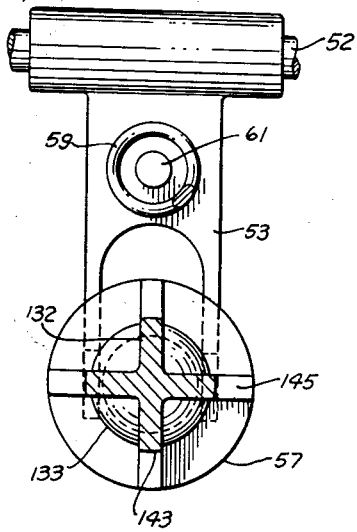
FIGURE 4 is a cross-section taken along line 4—4 of FIGURE 1 illustrating the sectional contour of the thermostatically actuated valve.
Figure 5:
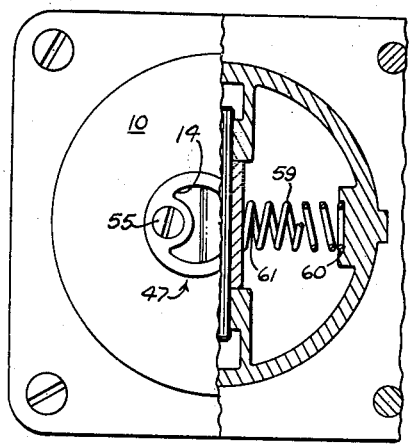
FIGURE 5 is a partial plan view partially in section taken along line 5—5 of FIGURE 1.

In the drawings, there is illustrated a valve body 10 having a cold water inlet conduit 11, a hot water inlet conduit 12, and an outlet passageway 14. The conduits 11 and 12 communicate with a mixing chamber 16 in which hot and cold water are mixed in suitable proportions, as desired, and discharged through the single outlet 14 connected, as by means of a flexible hose or the like, to the tub or container of a washing machine, or the like. Intermediate the inlets 11 and 12 and the mixing chamber 16 are valve assemblies 17 and 18, respectively, for opening, or closing, the flow of cold and hot water into the mixing chamber 16, and then through the outlet passageway 14. It is, of course, understood that either of the valve assemblies 17 and 18 may be operated individually, or simultaneously, to selectively supply cold, hot, or a mixture of cold and hot, water at intermediate temperatures through the outlet 14 to the washing tub, or the like.

Inasmuch as valve assemblies 17 and 18 are of similar construction, reference will be made hereinafter to details of the structure of valve 17, shown incorporated in the cold water side of the valve.

A flexible diaphragm 20 is secured adjacent its marginal edges to the valve body 10. Formed on the interior face of the diaphragm is a sealing lip 22 adapted to engage seat 23 of the valve body in order to shut off the flow of fluids in the cold water conduit 11. The sealing lip 22 is held against the valve seat 23 by plunger 24. The sealing lip is biased to closed position by coil spring 25. Surrounding the plunger 24 is a solenoid 27 shown in dotted lines which, upon electrical energization, withdraws the plunger from engagement with the diaphragm 20. This in turn permits the fluid pressures to force the diaphragm and sealing lip 22 away from the valve seat 23, for allowing the flow of fluids into the mixing chamber 16. The foregoing valve assembly 17 is further described in Smith Patent No. 2,742,925. Other valve assemblies for opening and closing the cold and/or hot water conduits may be employed.

A proportioning valve assembly 29 for regulation of the fluids at intermediate temperatures is mounted in the mixing chamber 16. When both valve assemblies 17, 18 are opened, for water at medium temperatures, the proportioning valve assembly 29 regulates the flow of fluids in said cold and hot water conduits. On the other hand, if cold, or hot, water is selected, the proportioning valve assembly is moved, so as not to interfere with the flow of the desired fluid.

Between the mixing chamber 16 and the cold water conduit 11, is interposed a wall 30. An aperture 31 is formed in the wall 30. Similarly, on the hot water side, wall 130 has an aperture 131 therein.

A throttle in the form of a plug 33 is mounted on a reciprocating carrier 35, for metering the flow of fluids through the aperture 31. When the plug 33 is moved into the mixing chamber 16, as shown in FIGURE 1, the cold fluids may freely enter the mixing chamber, illustrated by the arrows. As the plug moves upstream of the cold water inlet and enters the aperture 31, as shown in FIGURE 2, the effective opening of the aperture is restricted to impede the rate of flow of fluids. If the plug 33 is moved further upstream, it is received into chamber 37 of the cold water conduit 11 at the opposite side of wall 30 to again permit the free flow of fluids through the aperture 31. It will be noted that the rear side of the plug 33 is cut-away, or relieved to enlarge the effective opening of the aperture 31 when the plug is moved upstream beyond the aperture into the chamber 37. On the hot water side of the carrier 35 is a similar throttle 133.

The reciprocating carrier 35 may have a cruciform bearing section 32 for guiding the carrier 35 and plug 33 through aperture 31 during the reciprocating movements. The outer edges 43 of each of the cruciform sections forms a bearing surface that engages the mouth of the aperture 31. In this way the plug is permitted to slide between the mixing chamber 16 and the upstream side of aperture 31. Likewise, on the hot water side, cruciform sections 132 guide plug 133 on carrier 35 through aperture 131.

A shoulder, or stop, 45 may be formed on the carrier 35 to limit the travel of the carrier member in the upstream direction on the cold water side. Shoulder 145 limits the length of travel in the opposite direction.

Thermostat 47, responsive to the temperatures of the fluids in the outlet passageway 14, is employed for actuating carrier 35. The thermostat is a thermally responsive hydraulic device well-known in this field having expansion material 48 contained in a chamber juxtaposed to the outlet passageway. Rubber diaphragm, or sealing plugs, 49 contain the expansion material 48 and transmit the thermal action to control pin 50. Adjustment of the thermostat 47 is effected by a screw 55.

An arm 51 pivotally mounted on pin 52 engages the control pin 50. Crankarm 53, secured to the arm 51, is connected to a carrier 35 to actuate the latter in response to the forces produced by thermostat 47. The crankarm end is connected between a pair of shoulders 56, 57 on the carrier 35.

Coil spring 59 is biased against the crankarm 53 to insure continual contact between the arm 51 and the control pin 50. The spring may be mounted in a seat 60 in the valve body at one end, and held by a pin 61 on the crankarm 53 at the other end.

From the foregoing description, it is believed that the operation of the device is apparent. When fluids are desired of an intermediate temperature, both valve assemblies 17 and 18 are opened, as shown in FIGURE 1, to allow both cold and hot fluids to enter mixing chamber 16, from which they are discharged through outlet passageway 14. The thermostat 47 measures the temperature of the fluids leaving the mixing chamber through the outlet passageway and, through control pin 50 which actuates crankarm 53, adjusts the throttles 33, 133 mounted on the reciprocating carrier 35, to meter the water passing through the apertures 31, 131 for obtaining the final desired temperature. When the temperatures of the fluids in passageway 14 are below the setting for the desired temperature range of the thermostat 47, the expansion material 48 contracts, crankarm 53 is moved to the left, so that the plug 33 is moved into the aperture 31 to reduce its effective opening thereof for restricting the rate of flow of fluids therethrough. At the same time, on the hot water side, the plug is withdrawn from the aperture to increase the flow of hot water into the mixing chamber.

When the water in the outlet passageway 14 is above the setting of the thermostat 47, the expansion material 48 expands to move the crankarm 53 to the right. This moves the plug 133 on the hot water side into the hot water aperture 131 to restrict the effective opening thereof, and impede the flow of hot water through the mixing chamber. On the opposite end of the carrier, the plug 33 is withdrawn from the aperture 31 to increase the effective opening thereof, so additional cold water is introduced into the mixing chamber. Thus, the throttling action of the plugs 33, 133 mounted on carrier 35 maintains the water in the outlet passageway 14 within a temperature range determined by the thermostat 47.

If cold, or hot, water is selected, only one of the valve assemblies 17, or 18, is actuated. For example, if only the valve assembly 17 is opened, as shown in FIGURES 2 and 3, cold water flows in the mixing chamber and through the outlet passageway 14. The expansion material in the thermostat 47 contracts, moving the plug member toward the aperture 31. However, as the temperature of the cold water is below the temperature setting of the thermostat 47, the carrier will be moved to the extreme left position, as shown in FIGURE 3, so that the shoulders 45 engage the wall 30, and the plug 33 is located upstream of aperture 31 and enters the chamber 37. Since the rear, or downstream, side of the plug is cutaway, unrestricted flow of cold water is permitted through the aperture 31. A similar action occurs when only the hot water valve assembly 18 is opened, so that the plug 133 on the carrier 35 is moved into the chamber 137 of the hot water conduit on the upstream side of aperture 131 to permit free flow of hot water through the aperture.

In the drawings and specification there has been set forth a preferred embodiment of the invention, and although specific terms are employed, these are used in a generic and descriptive sense only, and not for purposes of limitation. Changes in form and the proportion of parts, as well as the substitution of equivalents are contemplated, as circumstances may suggest or render expedient, without departing from the spirit or scope of this invention as further defined in the following claims.

I claim:
1. In combination with a mixing chamber, means defining an effluent port for delivering fluids therefrom; a pair of conduits, each of said conduits defining an influent port for admitting sensibly different fluids to said mixing chamber; an on-off valve in each of said conduits for controlling fluid flow therethrough; a regulating valve in one influent port defined by one of said conduits and in downstream series with its on-off valve, said regulating valve including an orifice and a valve member disposed to restrict, without completely closing, said orifice when positioned to effect conditions of minimum flow, said valve member being afforded movement in both directions past said orifice so as to open the latter to maximum passage at positions of maximum offset with respect thereto in either direction; sensing means located at the effluent port; an actuator for controlling the position of said valve member connected to said sensing means and governed thereby; said valve member normally being positioned to one side of said orifice by said actuator with said sensing means and both on-off valves set to deliver fluids to and from the mixing chamber in a preselected proportion of mixture, the construction and arrangement of parts being such that when the fluid entering through the regulating valve predominates over that entering through the other influent port causing a departure from the preselected proportion, the sensing means detects the change and responds to move the actuator and valve member to restrict the flow through the orifice until the preselected proportion of mixture is restored; except that when the fluid flow through the orifice predominates perforce of the on-off valve of the other of said conduits being closed, then said sensing means and actuator continue to move said valve member past said orifice to open the latter so as to permit the relatively unrestricted flow of fluid to and through said effluent port.

2. In combination with a mixing chamber, means defining an effluent port for delivering fluids therefrom; a pair of conduits defining influent ports for admitting sensibly different fluids to said mixing chamber; an on-off valve in said conduits; a flow regulating valve in each influent port in series with and downstream from said on-off valve; a common actuator for said flow regulating valves interposed for movement in opposite directions; sensing means governing the movement of said actuator in or adjacent said effluent port in response to sensible changes in the fluid being delivered therefrom; each of said regulating valves including an orifice and a valve member disposed to restrict, without completely closing, said orifice when positioned to effect conditions of minimum flow, said valve member being afforded movement in both directions past said orifice so as to open the latter to maximum passage at positions of maximum offset in either direction, the valve members of both regulating valves being connected to each other and with said actuator so that, with the actuator in a neutral median position, both valve members are equidistant from their respective orifices in open position so as to pass substantially equal volumes of fluid from the on-off valves to said mixing chamber, the arrangement and construction of parts being such that when the flow from one influent port predominates the other so as to exceed a pre-selected proportion of mixture, the sensing means responds by moving said valve members through said actuator simultaneously to diminish the effective opening of only the orifice discharging the predominating flow, while maintaining or increasing the effective opening of the orifice of the other regulating valve until the preselected proportion of mixture is restored; except that when one on-off valve is closed with the fluid being admitted from the other influent port, the sensing means responds by moving the actuator and valve members first to diminish the effective opening of the regulating valve orifice in series with the open on-off valve, and then, in the absence of a counterbalancing flow from the closed influent port, to continue movement of the valve members so as to reopen the restricted orifice to allow the relatively unrestricted delivery of the selected fluid to and through said effluent port.

3. In combination with a mixing chamber, means defining an effluent port for delivering fluids therefrom; conduit means defining a pair of influent ports for admitting sensibly different fluids to said mixing chamber; a regulating valve in one of said influent ports for controlling fluid flow therethrough, said regulating valve including an orifice and a valve member disposed to restrict, without completely closing, said orifice when positioned to effect conditions of minimum flow, said valve member being afforded movement in both directions past said orifice so as to open the latter to maximum passage at positions of maximum offset with respect thereto in either direction; sensing means juxtaposed to the effluent port; an actuator for controlling the position of said valve member operatively connected to said sensing means and governed thereby; said valve member normally being positioned to one side of said orifice by said actuator with said sensing means set to deliver fluids from the mixing chamber in a preselected proportion of mixture, the construction and arrangement of parts being such that when the fluid entering through the regulating valve predominates over that entering through the other influent port causing a departure from the preselected proportion, the sensing means detects the change and responds to move the actuator and valve member to restrict the flow through the orifice until the preselected proportion of mixture is restored; except that when the fluid flow through the orifice predominates perforce of substantially non-flow through the other influent port, then said sensing means and actuator continue to move said valve member past said orifice to open the latter so as to permit the relatively unrestricted flow of fluid to and through said effluent port.

4. In combination with a mixing chamber, means defining an effluent port for delivering fluids therefrom; conduit means defining a pair of influent ports for admitting fluids having different temperatures to said mixing chamber; a regulating valve for controlling fluid flow through one of said influent ports, said regulating valve including an orifice and a valve member disposed to restrict, without completely closing, said orifice when positioned to effect conditions of minimum flow, said valve member being movable in both directions past said orifice so as to open the latter to maximum passage at positions of maximum offset with respect thereto in either direction; temperature sensing means responsive to effluent fluids; an actuator for controlling the position of said valve member operatively connected to said sensing means and governed thereby; said valve member normally being positioned to one side of said orifice by said actuator with said sensing means set to deliver fluids from the mixing chamber at a predetermined temperature, said sensing means being responsive to variations from said predetermined temperature caused by fluids entering through said regulating valve having a flow predominating over that of fluid entering through the other influent port for effecting movement of said valve member toward said orifice to restrict the flow through said orifice and restore said predetermined fluid temperature in said effluent port, said sensing means being further responsive to the absence of restoration of said predetermined fluid temperature for effecting movement of said valve member past said orifice to effect relatively unrestricted flow of fluid through said regulating valve.

5. In combination with a mixing chamber, means defining an effluent port for delivering fluids therefrom; a pair of conduits, each of said conduits defining an influent port for admitting fluids of different temperatures to said mixing chamber; an on-off valve in each of said conduits for controlling fluid flow therethrough; a regulating valve in one influent port defined by one of said conduits and in downstream series with its on-off valve, said regulating valve including an orifice and a valve member disposed to restrict, without completely closing, said orifice when positioned to effect conditions of minimum flow, said valve member being afforded movement in both directions past said orifice so as to open the latter to maximum passage at positions of maximum offset with respect thereto in either direction; temperature sensing means juxtaposed to the effluent port; an actuator for controlling the position of said valve member connected to said sensing means and governed thereby; said valve member normally being positioned to one side of said orifice by said actuator with said sensing means set to deliver fluids from the mixing chamber in a preselected temperature range, the construction and arrangement of parts being such that when the temperature of the fluid entering through the regulating valve predominates over that entering through the other influent port causing a departure from the preselected temperature range, the sensing means detects the change and responds to move the actuator and valve member to restrict the flow through the orifice until the preselected temperature range is restored; except that when the fluid flow through the orifice predominates perforce of the on-off valve of the other conduit being closed, then said sensing means and actuator continue to move said valve member past said orifice to open the latter so as to permit the relatively unrestricted flow of fluid to and through said effluent port.

6. In combination with a mixing chamber, means defining an effluent port for delivering fluids therefrom; a pair of conduits, each of said conduits defining an influent port for admitting fluids having different temperatures to said mixing chamber; an on-off valve in each of said conduits; a flow regulating valve in each conduit in series with and downstream from said on-off valve; a common actuator for said flow regulating valves interposed for movement in opposite directions; sensing means in or adjacent said effluent port governing the movement of said actuator in response to temperature changes in the fluid being delivered from said effluent port; each of said regulating valves having an orifice and a valve member disposed to restrict, without completely closing, said orifice when positioned to effect conditions of minimum flow, said valve member being afforded movement in both directions past said orifice so as to open the latter to maximum passage at positions of maximum offset in either direction, the valve members of both regulating valves being connected to each other and with said actuator, said sensing means being set to position said actuator and said valve members so as to pass fluid from said influent ports to said mixing chamber for delivery therefrom at a predetermined temperature, the arrangement and construction of parts being such that when the flow from one influent port predominates the other so as to cause a variation from said predetermined temperature, the sensing means responds by moving said valve members through said actuator simultaneously to diminish the effective opening of only the orifice discharging the fluid having the predominating flow, while maintaining or increasing the effective opening of the orifice of the other regulating valve until the predetermined temperature is restored; except that when one on-off valve is closed with the fluid being admitted from the other influent port, the sensing means responds by moving the actuator and valve members first to diminish the effective opening of the regulating valve orifice in series with the open on-off valve, and then, in the absence of a coutnerbalacing flow from the closed influent port, to continue movement of the valve members so as to reopen the restricted orifice to allow the relatively unrestricted delivery of the selected fluid to and through said effluent port.

7. In a device for mixing fluids, the combination comprising: a body member; a mixing chamber in said body member; means defining an effluent port for delivering fluids from said mixing chamber; a first influent conduit for admitting hot fluids to said mixing chamber; a second influent conduit for admitting cold fluids to said mixing chamber; a first wall member between said mixing chamber and said first influent conduit defining a first orifice; a second wall member between said mixing chamber and said second influent conduit defining a second orifice; proportioning valve means movable to positions relative to said orifices for controlling the relative effective openings thereof and disposed to restrict, without completely closing, one of said orifices when positioned to effect minimum flow therethrough, said proportioning valve means being further movable to positons past said orifices so as to open the latter to maximum passage at positions of maximum offset thereto in either direction; sensing means responsive to fluid temperatures in said effluent port and set to control fluids delivered from said mixing chamber to a preselected temperatrue; and actuator means responsive to said sensing means for moving said proportioning valve means, said sensing means being responsive to variations from said preselected temperature within a predetermined temperature range for controlling the position of said proportioning valve means, through said actuator means, to regulate the relative rate of flow through said orifice and to restore said preselected temperature, said sensing means being further responsive to sustained temperatures outside said predetermined temperature range and to non-restoration of said preselected temperature for effecting movement of said proportioning valve means, through said actuator means, to a maximum offset position for permitting maximum fluid flow through said influent conduits.

References Cited by the Examiner
UNITED STATES PATENTS

| 1,954,903 | 4/54 | Walker | 236—12 |
| 2,676,604 | 4/54 | Senna | 138—46 X |

EDWARD J. MICHAEL, *Primary Examiner.*